United States Patent [19]

Gehrke et al.

[11] 4,045,457
[45] Aug. 30, 1977

[54] ANTHRAQUINONE DYESTUFFS

[75] Inventors: Günter Gehrke, Cologne; Reinold Schmitz, Blecher; Hans-Samuel Bien, Burscheid; Helmut Herzog, Leverkusen, all of Germany

[73] Assignee: Bayer Aktiengesellschaft, Leverkusen, Germany

[21] Appl. No.: 624,292

[22] Filed: Oct. 20, 1975

[30] Foreign Application Priority Data

Oct. 23, 1974 Germany .................. 2450287

[51] Int. Cl.² ............................. C09B 1/10
[52] U.S. Cl. .................. 260/381; 8/39 C; 8/40; 260/380
[58] Field of Search ................ 260/381, 380

[56] References Cited

U.S. PATENT DOCUMENTS

| | | | |
|---|---|---|---|
| 2,134,654 | 10/1938 | Lulek | 260/381 |
| 3,821,262 | 6/1974 | Schoenauber et al. | 260/381 |

OTHER PUBLICATIONS

Murakami et al., Chem. Abstracts 80 (1974), No. 16444k.
Chemical Abstracts, 8th Collective Index, p. 4900F.

*Primary Examiner*—Arthur P. Demers
*Attorney, Agent, or Firm*—Plumley & Tyner

[57] ABSTRACT

The invention relates to a process for the preparation of water-insoluble chlorine-containing diaminodihydroxyanthraquinone dyestuffs. The process consists in that 2,8-dichloro-1,5-dinitroanthraquinone and/or 2,5-dichloro-1,8-dinitroanthraquinone is warmed with sulphur in concentrated sulphuric acid having a maximum $SO_3$ content of 20% - possibly in the presence of boric acid - the resulting compounds are, if appropriate, post-halogenated and/or alkylated, preferably in the same reaction batch.

The main advantage of this process is that it starts from 1,6- and/or 1,7-dichloroanthraquinone, for which there was hitherto no industrial use, but which unavoidably also arise during the synthesis 1,5- and 1,8-dichloroanthraquinones.

7 Claims, No Drawings

ANTHRAQUINONE DYESTUFFS

The present invention relates to an improved process for the preparation of water-insoluble chlorine-containing α,α'-diamino-α, α'-dihydroxyanthraquinone dyestuffs.

It is known that halogenated diaminodihydroxyanthraquinones are valuable disperse dyestuffs which dye synthetic fibre materials, especially polyester fibres, in deep blue shades having outstanding fastness properties.

The most customary method for the preparation of these types of dyestuff is to halogenate, for example chlorinate, corresponding diaminodihydroxyanthraquinones, for example 1,5-diamino-4,8-dihydroxyanthraquinone or 4,5-diamino-1,8-dihydroxyanthraquinone (compare, for example, German Patent Specification No. 1,029,506, corresponding to U.S. Pat. No. 2,990,413).

This process, which in itself is well-proven, however suffers from the disadvantage that the diaminodihydroxyanthraquinones which serve as starting materials are only accessible - starting from dichloroanthraquinones - by a method of synthesis which entails at least 4 stages, that is to say relatively expensively.

For example, the procedure followed is that 1,5-dichloroanthraquinone or 1,8-dichloroanthraquinone is first alkoxylated or phenoxylated, the reaction product is nitrated and the nitration product is hydrolysed and finally reduced (compare BIOS Final Report 1493, page 8).

It has now been found that chlorine-containing diaminodihydroxyanthraquinones are obtained in a simple manner when 2,8-dichloro-1,5-dinitroanthraquinone and/or 2,5-dichloro-1,8-dinitroanthraquinone is warmed with sulphur in concentrated sulphuric acid having a maximum $SO_3$ content of 20%, if appropriate in the presence of boric acid, and the resulting compounds are, if appropriate, post-halogenated and/or alkylated, preferably in the same reaction batch.

The starting materials for the process according to the invention can be obtained in a manner which is in itself known (compare, for example, German Pat. Specification No. 137,782) by nitration of 1,6- and/or 1,7-dichloroanthraquinone in concentrated nitric acid or with nitrating acid in concentrated sulphuric acid or oleum at temperatures of 0°–100°, preferably 20°–50°. If the nitration starts from a mixture of 1,6- and 1,7-dichloroanthraquinone, the nitration can, under suitable reaction conditions, also be coupled with a separation of the two isomers, since the 2,8-dichloro-1,5-dinitroanthraquinone is less soluble.

A further advantage of the process according to the invention is, accordingly, that it starts from 1,6- and/or 1,7-derivatives of anthraquinone, for which there was hitherto no industrial use, but which unavoidably also arise during the synthesis of 1,5- and 1,8-anthraquinone derivatives.

1,6- and 1,7-dichloroanthraquinone are suitably obtained by "Fischering" (compare Ullmanns Encyklopaedie der technischen Chemie (Ullmanns Encyclopedia of Industrial Chemistry), 4th edition, volume 7, page 589) of anthraquinone-disulphonation batches, with subsequent separation of the chloroanthraquinone mixture thus obtained. It is particularly advantageous to obtain the dichloroanthraquinones here required by "Fischering" of effluents which arise from the industrial disulphonation of anthraquinone catalysed by mercury.

These novel methods of preparation of chloroanthraquinones however do not form a subject of the present invention.

The reaction of 2,8-dichloro-1,5-dinitroanthraquinone and/or 2,5-dichloro 1,8-dinitroanthraquinone is advantageously carried out in the presence of boric acid in concentrated sulphuric acid having a maximum $SO_3$ content of 20%, at temperatures of 70°–170°.

In general, 1-6 mols of sulphur powder, preferably 3-4 mols of sulphur powder, are employed per mol of dinitrocompound. The reaction time is 1-10 hours. During the reaction, a part of the chlorine split off in the α-position can re-enter the molecule in the β-position.

A post-halogenation can be carried out in suitable solvents. However, it is conveniently carried out in the same reaction batch as the reaction with sulphur in sulphuric acid, that is to say without intermediate isolation. Possible halogenating agents are chlorine, sulphuryl chloride, chlorosulphonic acid and above all bromine. The halogenation temperatures are 10° to 100°, preferably 50° to 80°. Preferably, dyestuffs which contain 1–2.5 atoms of halogen in the molecule are prepared. The alkylation can be carried out with customary alkylating agents, such as alcohols, alkyl sulphates, alkyl halides or alkyl esters of arylsulphonic acids, in inert solvents. Preferably, methanol in sulphuric acid is used, at 80°–180° C.

The compounds manufactured in accordance with the process of the invention are outstandingly suitable for dyeing synthetic fibre materials, especially polyester, polyamide and cellulose triacetate fibres, which are dyed, in accordance with the customary dyeing processes, in clear blue shades having good general fastness properties.

In addition, the products of the process can also be used as intermediate products for the preparation of dyestuffs by, for example, reacting them, in a manner which is in itself known, with acylating agents (DOS (German Published Specification) 1,928,131 = British Patent Specification 1,275,337), with glycols or thioalcohols (DOS (German Published Specification) 1,644,516 = British Patent Specification 1,140,153) or with sulphinates (DOS (German Published Specification) 1,644,578 = British Patent Specification No. 1,053,455).

The process according to the invention will be explained in more detail with the aid of the examples which follow, wherein parts in general denote parts by weight.

EXAMPLE 1

20 parts of a mixture of approximately equal parts of 2,8-dichloro-1,5-dinitro-anthraquinone and 2,5-dichloro-1,8-dinitro-anthraquinone and 6 parts of sulphur are introduced into a solution of 10 parts of boric acid in 200 parts of 5% strength oleum. The reaction mixture is stirred for 4 – 6 hours at 150° until a sample withdrawn periodically and worked up in the usual way shows no further change in chromatogram. After cooling to room temperature, the reaction mixture is poured onto about 2,000 parts of water and the product is filtered off, washed until neutral and dried. 16 parts of a dyestuff containing 11.6% of chlorine and consisting essentially of 3-chloro-4,8-diamino-1,5-dihydroxy-anthraquinone and 3-chloro-4,5-diamino-1,8-dihydroxy-anthraquinone are obtained.

Following the customary dyeing processes, this dyestuff gives deep blue dyeings, of good fastness to light, on fibres of polyester, polyamide or cellulose triacetate.

EXAMPLE 2

20 parts of the mixture employed in Example 1 are reacted as described there. Before pouring the reaction mixture into water, 0.1 part of iodine and 10 parts of bromine are added to the mixture which is then stirred for a further 15 hours at 80°. After cooling to room temperature, the batch is poured onto a mixture of 2,000 parts of water and 50 parts of concentrated bisulphite solution and the product is filtered off, washed until neutral and dried. 20 parts of a dyestuff which contains 9.2% of chlorine and 18.9% of bromine and which gives a blue dyeing of very good fastness to light and good fastness to sublimation on polyester fibres are obtained.

EXAMPLE 3

20 parts of the mixture employed in Example 1 are reacted as described there. Before pouring the reaction mixture into water, 0.1 part of iodine is added to the mixture and chlorine is then passed in for about 1 hour, until a sample, when worked up, contains about 15–16% of chlorine. After working up as in Example 2, 17 parts of a dyestuff which gives a deep dyeing of good fastness to light on polyester fibres are obtained.

EXAMPLE 4

20 parts of the mixture employed in Example 1 are reacted as described there. Before pouring the reaction mixture into water, 20 parts of methanol are added at 25° C and the mixture is stirred for a further 10 hours at 120° C and then worked up as in Example 1. 16 parts of a dyestuff which gives somewhat more greenish-tinged blue dyeings than the dyestuff according to Example 1 are obtained.

EXAMPLE 5

20 parts of the mixture employed in Example 2 are reacted with sulphur, and brominated, as described there. Before pouring the reaction mixture into water, 20 parts of methanol are added at 25° C and the mixture is stirred for a further 15 hours at 100° C and then worked up as in Example 2. 20 parts of a dyestuff which gives somewhat more greenish-tinged blue dyeings than the dyestuff according to Example 2 are obtained.

EXAMPLE 6

10 parts of the dyestuff obtained according to Example 1 are dissolved in 50 parts of sulphuric acid monohydrate. After adding 10 parts of methanol, the mixture is heated to 150° C over the course of 2 hours and is then stirred for a further 2 hours at 150° C. After cooling, the reaction mixture is poured into 500 parts of water and the product is filtered off, washed until neutral and dried. 10 parts of a dyestuff which gives strong greenish-tinged blue dyeings on polyester fibres are obtained.

EXAMPLE 7

20 parts of 2,8-dichloro-1,5-dinitro-anthraquinone and 5 parts of sulphur are introduced into a solution of 10 parts of boric acid in 200 parts of 10% strength oleum. The reaction mixture is stirred at 120° until a sample, when worked up, shows no further change. After working up as in Example 1, 16 parts of a dyestuff containing 11.8% of chlorine and consisting essentially of 3-chloro-4,8-diamino-1,5-dihydroxy-anthraquinone are obtained.

EXAMPLE 8

20 parts of 2,5-dichloro-1,8-dinitro-anthraquinone and 6 parts of sulphur are introduced into a solution of 10 parts of boric acid in 300 parts of sulphuric acid monohydrate. The reaction mixture is stirred at 160° until a sample, when worked up, shows no further change. After working up as in Example 1, 16 parts of a dyestuff containing 11.9% of chlorine and consisting essentially of 3-chloro-4,5-diamino-1,8-dihydroxyanthraquinone are obtained.

We claim:

1. Process for the preparation of "α, α'-diamino-α, α'-dihydroxy-β-chloroanthraquinones" comprising warming 2,8-dichloro-1,5-dinitro-anthraquinone, 2,5-dichloro-1,8-dinitro-anthraquinone or mixtures thereof with sulfur in concentrated sulfuric acid or oleum having a maximum $SO_3$ content of 20% in the presence of boric acid.

2. The process of claim 1 wherein the dichloro-dinitro-anthraquinone is warmed with sulfur in non-aqueous sulfuric acid.

3. The process of claim 1 wherein the dichloro-dinitro-anthraquinone is warmed with sulfur in oleum having a maximum $SO_3$ content of 20%.

4. Process of claim 3, wherein the reaction is carried out at 70 to 170° C.

5. Process of claim 3, wherein the diaminodihydroxyanthraquinone product is post-halogenated and 0.5 to 1.5 atoms of halogen are introduced per molecule of anthraquinone compound.

6. Process according to claim 3, characterised in that the diaminodihydroxyanthraquinone product is alkylated by means of methanol/sulphuric acid at 80°–180° C.

7. The process of claim 5 wherein the post-halogenation is carried out in the same reaction batch without intermediate isolation of the diaminodihydroxyanthraquinone product.

* * * * *